(12) United States Patent
Taniguchi et al.

(10) Patent No.: US 10,641,304 B2
(45) Date of Patent: May 5, 2020

(54) RESISTANCE SPOT WELDING METHOD AND WELD JOINT

(71) Applicant: JFE STEEL CORPORATION, Tokyo (JP)

(72) Inventors: Koichi Taniguchi, Chiba (JP); Yasuaki Okita, Chiba (JP); Rinsei Ikeda, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 364 days.

(21) Appl. No.: 15/554,915

(22) PCT Filed: Mar. 3, 2016

(86) PCT No.: PCT/JP2016/001173
§ 371 (c)(1),
(2) Date: Aug. 31, 2017

(87) PCT Pub. No.: WO2016/139951
PCT Pub. Date: Sep. 9, 2016

(65) Prior Publication Data
US 2018/0038402 A1 Feb. 8, 2018

(30) Foreign Application Priority Data

Mar. 5, 2015 (JP) .................................. 2015-043053

(51) Int. Cl.
*B23K 11/10* (2006.01)
*F16B 5/08* (2006.01)
(Continued)

(52) U.S. Cl.
CPC ................ *F16B 5/08* (2013.01); *B23K 11/11* (2013.01); *B23K 11/16* (2013.01); *B23K 11/163* (2013.01);
(Continued)

(58) Field of Classification Search
CPC ..... B23K 11/002; B23K 11/11; B23K 11/115; B23K 11/16; B23K 11/163; B23K 11/185;
(Continued)

(56) References Cited

U.S. PATENT DOCUMENTS 4,694,135 A 9/1987 Nagel et al.
6,043,449 A 3/2000 Kanjo
(Continued)

FOREIGN PATENT DOCUMENTS

CN        1665636 A      9/2005
CN     102300667 A    12/2011
(Continued)

OTHER PUBLICATIONS

International Search Report and Written Opinion for International Application No. PCT/JP2016/001173, dated May 24, 2016.
(Continued)

*Primary Examiner* — Hung D Nguyen
(74) *Attorney, Agent, or Firm* — Ratnerprestia

(57) ABSTRACT

Provided is a method for resistance spot-welding at least two overlapping steel sheets. When an electrode force F after an electric current supply is started changes from an initial electrode force Fi to an electrode force $F_h^{(1)}$ while a lapse from the start of the electric current supply is between 20 ms and 80 ms inclusive, a suspension of the electric current supply of from 20 ms to 60 ms inclusive is started. Then the electric current supply is resumed when the electrode force F reaches an electrode force $F_c^{(1)}$.

16 Claims, 2 Drawing Sheets

(51) Int. Cl.
  *B23K 11/11* (2006.01)
  *B23K 11/16* (2006.01)
  *B23K 9/28* (2006.01)
  *B23K 103/04* (2006.01)
  *B23K 101/34* (2006.01)

(52) U.S. Cl.
  CPC ...... *B23K 2101/34* (2018.08); *B23K 2103/04* (2018.08)

(58) Field of Classification Search
  CPC ....... B23K 11/20; B23K 11/24; B23K 11/241; B23K 11/245; B23K 11/25; B23K 11/253; B23K 11/255; B23K 11/31; B23K 11/36; B23K 2103/04; B23K 2103/05; B23K 2103/10; B23K 2101/006; B23K 2101/18; B23K 2101/34; F16B 5/08
  USPC ........... 219/78.01, 86.1, 86.22, 86.23, 86.41, 219/86.51, 86.61, 86.7, 91.1, 92, 108, 219/117.1, 91.2
  See application file for complete search history.

(56) References Cited

U.S. PATENT DOCUMENTS

| | | | |
|---|---|---|---|
| 6,515,251 B1 | 2/2003 | Wind | |
| 2005/0230362 A1 | 10/2005 | Stieglbauer et al. | |
| 2011/0180518 A1 | 7/2011 | Hasegawa et al. | |
| 2011/0303655 A1* | 12/2011 | Kanai | B23K 11/115 219/660 |
| 2012/0055910 A1 | 3/2012 | Sakai et al. | |
| 2012/0141829 A1* | 6/2012 | Oikawa | B23K 11/115 219/118 |
| 2013/0092671 A1 | 4/2013 | Sakai | |
| 2014/0120371 A1 | 5/2014 | Mbacke et al. | |
| 2014/0183168 A1 | 7/2014 | Arndt et al. | |
| 2014/0248758 A1 | 9/2014 | Weiss et al. | |
| 2016/0144451 A1* | 5/2016 | Fujimoto | B23K 11/16 219/92 |

FOREIGN PATENT DOCUMENTS

| | | | |
|---|---|---|---|
| CN | 102430851 A | 5/2012 |
| CN | 102581459 A | 7/2012 |
| CN | 103042295 A | 4/2013 |
| CN | 103889634 A | 6/2014 |
| CN | 103889643 A | 6/2014 |
| EP | 0813928 A2 | 12/1997 |
| EP | 2392428 A1 | 12/2011 |
| EP | 2769797 A1 | 8/2014 |
| EP | 2977138 A1 | 1/2016 |
| EP | 3020499 A1 | 5/2016 |
| JP | 10058157 A | 3/1998 |
| JP | 11333566 A | 12/1999 |
| JP | 3849539 B2 | 11/2006 |
| JP | 3922263 B2 | 5/2007 |
| JP | 2008290098 A | 12/2008 |
| JP | 2010110816 A | 5/2010 |
| JP | 4728926 B2 | 7/2011 |
| JP | 2011167742 A | 9/2011 |
| JP | 2012125808 A | 7/2012 |
| JP | 2012187639 A | 10/2012 |
| JP | 2014180686 A | 9/2014 |
| JP | 2014523478 A | 9/2014 |
| WO | 2015005134 A1 | 1/2015 |

OTHER PUBLICATIONS

Korean Office Action for Korean Application No. 10-2017-7024488, dated Mar. 25, 2019 with Concise Statement of Relevance of Office Action, 4 pages.
Extended European Search Report for European Application No. 16758648.6, dated Feb. 14, 2018. 7 pages.
Korean Notice of Allowance for Korean Application No. 10-2017-7024489. dated Dec. 3, 2018 with translation, 2 pages.
Korean Office Action for Korean Application No. 10-2017-7024488, dated Aug. 21, 2018, with Concise Statement of Relevance of Office Action, 5 pages.
Extended European Search Report for European Application No. 16 758 647.8, dated Feb. 16, 2018, 8 pages.
Chinese Office Action with Search Report for Chinese Application No. 201680013278.X, dated Jan. 29, 2019, 7 pages.
Chinese Office Action with Search Report for Chinese Application No. 201680013283.0, dated Jan. 4, 2019, 9 pages.
Non Final Office Action for U.S. Appl. No. 15/555,135, dated Jan. 30, 2020, 41 pages.

* cited by examiner

RESISTANCE SPOT WELDING METHOD AND WELD JOINT

CROSS REFERENCE TO RELATED APPLICATIONS

This is the U.S. National Phase application of PCT/JP2016/001173, filed Mar. 3, 2016, which claims priority to Japanese Patent Application No. 2015-043053, filed Mar. 5, 2015, the disclosures of these applications being incorporated herein by reference in their entireties for all purposes.

TECHNICAL FIELD OF THE INVENTION

The present invention relates to a resistance spot welding method, which is one type of lap resistance welding method, and to a weld joint produced by the resistance spot welding method.

BACKGROUND OF THE INVENTION

To achieve an improvement in reliability of vehicle bodies and a reduction in weight of the vehicle bodies for the purpose of an improvement in fuel consumption, strengthening of steel sheets has been pursued in recent years. The use of high-strength steel sheets allows vehicle bodies to have stiffness comparable to that obtained using conventional steel even when the steel sheets are reduced in thickness and weight. However, some problems have been pointed out. One of them is a reduction in the strength of welded portions.

As shown in FIG. 1, in resistance spot welding, a sheet set 3 including at least two overlapping steel sheets (in this case, two steel sheets including a lower steel sheet 1 and an upper steel sheet 2) is held between a vertical pair of electrodes (a lower electrode 4 and an upper electrode 5), and an electric current is applied under pressure to melt a contact region between the steel sheets 1 and 2. A nugget 6 of the required size is thereby formed, and a weld joint is obtained.

The quality of the joint obtained in the manner described above is evaluated by, for example, the diameter of the nugget, tensile shear strength (the strength when a tensile test is performed in a shear direction of the joint), cross-tension strength (the strength when a tensile test is performed in a separation direction of the joint), or fatigue strength. In particular, as the strength of a steel sheet increases, the amount of C in the steel sheet tends to increase. It is known that, in a high-strength steel sheet containing a large amount of C, its cross-tension strength is low.

In terms of the welding method, to ensure the cross-tension strength when the high-strength steel sheet is used, it is contemplated to increase the diameter of the nugget. Generally, to increase the size of the nugget, an electric current must be increased. In this case, the possibility of the occurrence of expulsion becomes high. If expulsion occurs, the nugget is rather reduced in size, and this causes a reduction in the strength of the joint.

In particular, the surfaces of steel sheets for automobiles are subjected to galvanization treatment with zinc as a main component for the purpose of rust prevention. It is known that, when steel sheets having such galvanized layers are used for automobiles and subjected to resistance spot welding to assemble the automobiles, expulsion is likely to occur, and it is therefore difficult to ensure large nuggets.

A conventional technique disclosed in Patent Literature 1 is a method for forming nuggets in three stacked steel sheets. In the disclosed method, after a first welding step is performed, second and subsequent welding steps are performed such that the supply of electric current and the suspension of the supply are repeated in a pulsated manner. This allows nuggets with sufficient diameters to be formed even when the sheet set including three sheets is composed of a thin sheet, a thick sheet, and a thick sheet.

Patent Literature 2 discloses that, when steel sheets having on their surfaces alloyed aluminum coating layers containing Fe at an atomic percentage of from 50% to 80% inclusive are welded, a nugget can be formed stably by specifying, according to the thickness of the sheets, the period of time during which the current is held constant after upslope energization.

Patent Literature 3 describes that, with zinc or zinc alloy coated steel sheets, a nugget having a certain size can be ensured by limiting the ratio of the period of preliminary energization to the period of the formation of the nugget.

Patent Literature 4 discloses that, with zinc or zinc alloy coated steel sheets, a nugget having a certain size can be ensured by, after preliminary energization, repeating cooling and energization using a current value higher than the current value for the preliminary energization.

PATENT LITERATURE

PTL 1: Japanese Patent No. 4728926
PTL 2: Japanese Unexamined Patent Application Publication No. 2011-167742
PTL 3: Japanese Patent No. 3849539
PTL 4: Japanese Patent No. 3922263

SUMMARY OF THE INVENTION

At a welding site for actual automobile assembly, unintended work disturbances such as a sheet gap are present and affect the formation of a nugget. The methods described in Patent Literatures 1 to 4 have a problem in that it is difficult to ensure a nugget diameter stably when work disturbances are present.

In certain embodiments of the present invention a resistance spot welding method that allows a large nugget to be formed while the occurrence of expulsion is prevented, whereby the diameter of the nugget can be ensured stably even when work disturbances such as a sheet gap are present, is provided. In certain other embodiments of the present invention a weld joint produced by the resistance spot welding method is provided.

The resistance spot welding of a sheet set including high-strength steel sheets was repeatedly studied. In the studies, the electrode force applied between the electrodes during welding was measured in real time. Specifically, a pressure mechanism including an upper electrode for applying an electrode force adjustable to a designated value (referred to as a designated electrode force) through a servo gun was used to measure the value of the load applied between the electrodes during welding in real time (the load value is referred to as a measured electrode force or simply as an electrode force). The measurement showed that the designated electrode force applied through the servo gun differed from the electrode force applied between the electrodes during welding.

Generally, in a servo-controlled resistance spot welding device, the initial electrode force, which is the electrode force applied between the electrodes before the supply of electric current, is approximately the same as the designated electrode force. During welding, the electrode force applied between the electrodes is higher than the designated electrode force because the movement of the electrodes is suppressed because of frictional force caused by an electrode cylinder.

As a result, it was determined that there is a close relation between the occurrence of expulsion and the electrode force. Specifically, in the case where the electrode force increased rapidly in an initial stage of the electric current supply, expulsion occurred when the electrode force exceeded a certain value. Then, after the electric current supply was suspended and the electrode force was reduced, the electric current supply was resumed. In this case, no expulsion occurred even when the electrode force was higher than that in the first electric current supply.

Examples of the results obtained are shown in FIGS. 2 and 3. FIG. 2 is a graph showing changes in electrode force with respect to the initial electrode force when the resistance spot welding was performed while the electric current supply and the suspension of the supply were repeated. FIG. 3 is a graph showing changes in electrode force with respect to the initial electrode force when the resistance spot welding was performed while a constant electric current was supplied. In these experiments, a pressure was applied for about 10 cycles (200 ms) before the electric current was supplied to thereby obtain a stable state, and then the electric current supply was started. The average electrode force in the first cycle (20 ms) after the start of the electric current supply is referred to as the initial electrode force.

As shown in FIG. 2, no expulsion occurred when the electric current supply and the suspension of the supply were repeated, and the diameter of the nugget obtained was large. However, as shown in FIG. 3, when a constant electric current was supplied continuously, expulsion occurred, and the diameter of the nugget was small.

Without being bound by theory, this mechanism may be as follows. In the initial stage of the electric current supply, a nugget is formed rapidly and expands, and this causes the measured electrode force to increase. Expulsion may occur when the pressurized state around the nugget is insufficient. Therefore, when the measured electrode force becomes equal to or larger than a prescribed value during the electric current supply, the relative pressure around the nugget decreases, and this may cause expulsion to occur. When the increase in the electrode force is small, which indicates the thermal expansion due to the formation of the nugget is small, and this results in an insufficient nugget diameter.

When the electric current supply is suspended, the nugget solidifies and contracts, and the measured electrode force decreases. At the same time, heat is transferred to the surroundings of the nugget, and the temperature of the portion around the nugget increases. This portion is thereby softened, and the pressurized state by the electrodes is ensured, so that the occurrence of expulsion can be prevented. However, as the period of time after the start of the suspension of the electric current supply increases, cooling proceeds, and it becomes difficult to form a nugget during the subsequent supply of the electric current.

In view of the above, whether a nugget with a large diameter can be formed without the occurrence of expulsion by utilizing the above phenomenon while the electrode force is controlled was studied. As a result, it was determined that in an initial stage of the supply of electric current, the electric current supply and the suspension of the supply are repeated, and the electrode force is controlled appropriately during the repetitions. This allows the final diameter of the nugget to be increased while the occurrence of expulsion is prevented.

Embodiments according to the present invention are as follows:

[1] A resistance spot welding method for resistance spot-welding at least two steel sheets overlapping each other, the method comprising:

starting a suspension of an electric current supply for from 20 ms to 60 ms inclusive when an electrode force F after the electric current supply is started changes from an initial electrode force Fi to an electrode force $F_h^{(1)}$ represented by formula (1) while a lapse from the start of the electric current supply is between 20 ms and 80 ms inclusive; and resuming the electric current supply when the electrode force F reaches an electrode force $F_c^{(1)}$ represented by formula (2):

$$1.03 \times Fi \leq F_h^{(1)} \leq 1.15 \times Fi, \quad (1)$$

$$1.01 \times Fi \leq F_c^{(1)} \leq 0.99 \times F_h^{(1)}. \quad (2)$$

[2] The resistance spot welding method according to [1], further comprising, after the suspension of the electric current supply, repeating at least once the electric current supply for from 20 ms to 80 ms inclusive and the suspension of the electric current supply for from 20 ms to 60 ms inclusive such that, when the electrode force F during an Nth electric current supply changes from an electrode force $F_c^{(N-1)}$ immediately after an (N−1)th suspension of the electric current supply to an electrode force $F_h^{(N)}$ represented by formula (3), the suspension of the electric current supply is started, and then, the electric current supply is resumed when the electrode force F reaches an electrode force $F_c^{(N)}$ represented by formula (4):

$$1.04 \times F_c^{(N-1)} \leq F_h^{(N)} \leq 1.15 \times F_c^{(N-1)}, \quad (3)$$

$$F_c^{(N-1)} \leq F_c^{(N)} \leq 0.99 \times F_h^{(N)}, \quad (4)$$

where N is a natural number of 2 or more.

[3] The resistance spot welding method according to [1] or [2], wherein the period of a last repetition of the electric current supply is from 100 ms to 300 ms inclusive.

[4] The resistance spot welding method according to any of [1] to [3], wherein at least one of the at least two steel sheets contains components including 0.15≤C≤0.30 (% by mass), 1.9≤Mn≤5.0 (% by mass), and 0.2≤Si≤2.0 (% by mass).

[5] The resistance spot welding method according to any of [1] to [4], wherein at least one of the at least two steel sheets has a tensile strength of 980 MPa or more.

[6] The resistance spot welding method according to any of [1] to [5], wherein at least one of the at least two steel sheets has, on a surface thereof, a coating layer containing zinc as a main component.

[7] A weld joint produced by the resistance spot welding method according to any of [1] to [6].

Advantageous Effects of Invention

According to embodiments of the present invention, when the resistance spot welding method is applied to a sheet set including a plurality of overlapping steel sheets, a large nugget can be formed while the occurrence of expulsion is prevented.

DETAILED DESCRIPTION OF THE INVENTION

An embodiment of the present invention will next be described with reference to the accompanying drawings.

Figure 1:
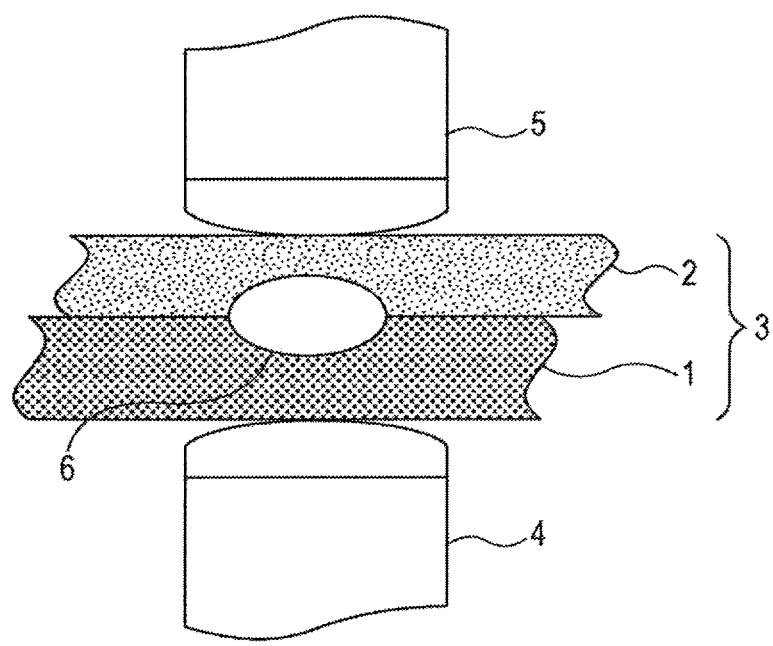
FIG. 1 is an illustration showing the outline of resistance spot welding.
Figure 2:
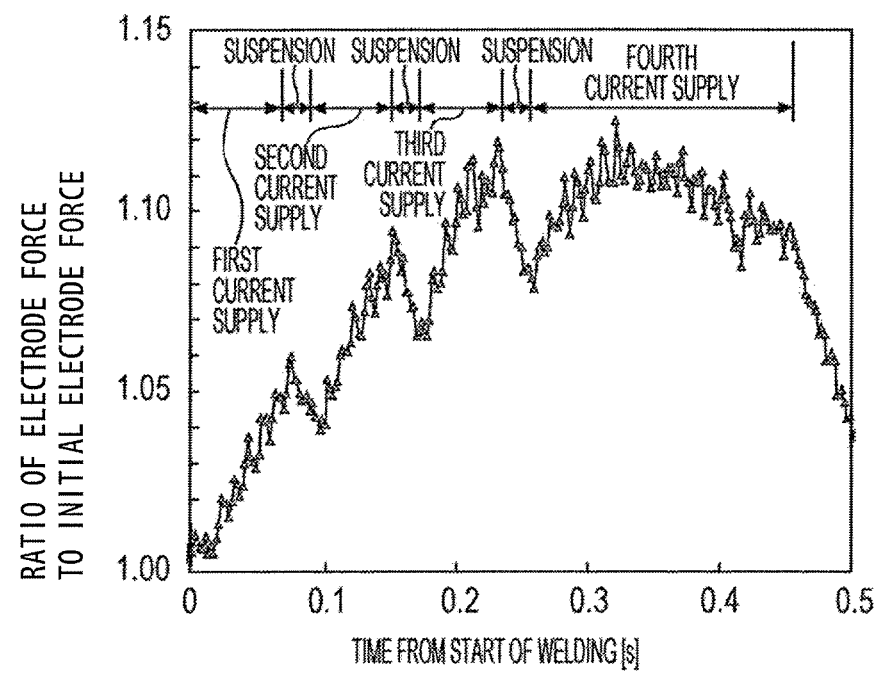
FIG. 2 is a graph showing changes in electrode force with respect to the initial electrode force when the resistance spot welding was performed while the supply of electric current and the suspension of the supply were repeated.
Figure 3:
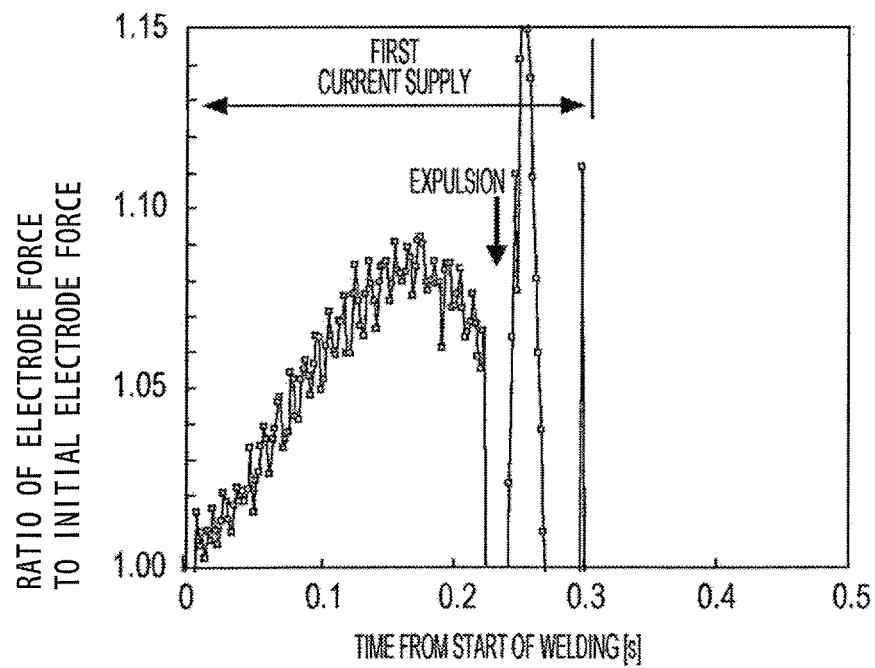
FIG. 3 is a graph showing changes in electrode force with respect to the initial electrode force when the resistance spot welding was performed while a constant electric current was supplied.

In the resistance spot welding method according to embodiments of the present invention, a sheet set 3 including overlapping steel sheets 1 and 2 is held between a vertical pair of electrodes 4 and 5 as shown in FIG. 1, and an electric current is supplied to the sheet set 3 under pressure. A nugget 6 of the required size is thereby formed, and a weld joint is obtained.

An embodiment of the present invention is a method for resistance spot-welding overlapping steel sheets, and the electrode force F between the electrodes is controlled as follows.

When the electrode force F after an electric current supply is started changes from an initial electrode force Fi to an electrode force $F_h^{(1)}$ represented by formula (1) while a lapse from the start of the electric current supply is between 20 ms and 80 ms inclusive, a suspension of the electric current supply for from 20 ms to 60 ms inclusive is started.

Then the electric current supply is resumed when the electrode force F reaches an electrode force $F_c^{(1)}$ represented by formula (2).

$$1.03 \times Fi \leq F_h^{(1)} \leq 1.15 \times Fi \quad (1)$$

$$1.01 \times Fi \leq F_c^{(1)} \leq 0.99 \times F_h^{(1)} \quad (2)$$

If $F_h^{(1)}$ is less than $1.03 \times F_i$, a region in the vicinity of the nugget is not pressurized sufficiently, and the probability of the occurrence of expulsion becomes high. If $F_h^{(1)}$ is larger than $1.15 \times F_i$, the growth of the nugget is inhibited. If $F_c^{(1)}$ is less than $1.01 \times Fi$, cooling proceeds, and therefore the effects of the subsequent heating become small. If $F_c^{(N)}$ is larger than $0.99 \times F_h^{(1)}$, the temperature of the nugget is high, and therefore the possibility of the occurrence of expulsion when the electric current supply is resumed increases.

Before the electric current is supplied, a pressure is applied for about 10 cycles (200 ms) to obtain a stable state, and then the supply of the electric current is started. The initial electrode force Fi used is the average electrode force in the first cycle (20 ms) after the start of the supply. The electrode force immediately after the start of the electric current supply is approximately the same as a set electrode force (designated electrode force) of a servo gun, and therefore the designated electrode force may be used as the initial electrode force Fi. Alternatively, the average electrode force in a period from 0 ms to 20 ms after the start of the electric current supply may be used as the initial electrode force Fi.

In embodiments of the present invention, after the suspension of the electric current supply, the electric current supply for from 20 ms to 80 ms inclusive and the suspension of the electric current supply for from 20 ms to 60 ms inclusive are repeated at least once.

In this case, when the electrode force F during the Nth electric current supply changes from an electrode force $F_c^{(N-1)}$ immediately after the (N–1)th suspension of the electric current supply to an electrode force $F_h^{(N)}$ represented by formula (3), the suspension of the electric current supply is started. Then, when the electrode force F reaches an electrode force $F_c^{(N)}$ represented by formula (4), the electric current supply is resumed. N is a natural number of 2 or more.

$$1.04 \times F_c^{(N-1)} \leq F_h^{(N)} \leq 1.15 \times F_c^{(N-1)} \quad (3)$$

$$F_c^{(N-1)} \leq F_c^{(N)} \leq 0.99 \times F_h^{(N)} \quad (4)$$

If $F_h^{(N)}$ is less than $1.04 \times F_c^{(N-1)}$, a region in the vicinity of the nugget is not pressurized sufficiently, and the probability of the occurrence of expulsion becomes high. If $F_h^{(N)}$ is larger than $1.15 \times F_c^{(N-1)}$, the growth of the nugget is inhibited. If $F_c^{(N)}$ is less than $F_c^{(N-1)}$, cooling proceeds, and therefore the effects of the subsequent heating become small. If $F_c^{(N)}$ is larger than $0.99 \times F_h^{(N)}$, the temperature of the nugget is high, and the possibility of the occurrence of expulsion when the electric current supply is resumed increases.

In embodiments of the present invention, the period of the last repetition of the electric current supply is preferably from 100 ms to 300 ms inclusive. If the period of the last repetition is less than 100 ms, the formation of the nugget is insufficient. If the period of the last repetition of the electric current supply exceeds 300 ms, the workability deteriorates, and the contribution of the electric current supply to the formation of the nugget is small. The period of the last repetition of the electric current supply may be selected optimally within the above range according to the period required for the first electric current supply and the subsequent repetitions of the electric current supply and the suspension of the electric current supply.

The welding device on which the spot welding method according to embodiments of the present invention is performed may be any welding device, so long as it includes: a vertical pair of electrodes which holds parts to be welded and through which the electrode force and the electric current are applied; and a welding current controller that can control the welding current freely during welding. No particular limitation is imposed on the pressure mechanism (such as an air cylinder or a servo motor), the current control mechanism (such as an AC or DC current control mechanism), the type (such as a stationary type or a robot gun), etc.

To perform the spot welding method according to embodiments of the present invention, a unit that can measure the electrode force F is installed in the welding device described above and is configured as follows. While the electrode force F is measured during the electric current supply, the electrode force F is controlled according to the measurement results. Specifically, a strain gauge is mounted to an arm of a C gun type welding device that holds the upper and lower electrodes. The strain of the arm during the electric current supply is detected to detect the force applied between the electrodes, and the force applied between the electrodes may be used as the electrode force.

When the spot welding method according to embodiments of the present invention is performed, the real-time measurement of the electrode force F during the electric current supply is not essential. An experiment may be performed on a sheet set in advance to obtain a current supply-suspension pattern that allows appropriate control of the electrode force F. Then the current supply-suspension pattern obtained may be used to weld a sheet set similar to the sheet set tested in advance.

In certain embodiments, the present invention is applied to a welding method for a sheet set of a plurality of sheets including a galvanized steel sheet or a high-strength steel sheet. Galvanized steel sheets and high-strength steel sheets are more likely to cause expulsion due to a sheet gap than ordinary steel sheets. However, since certain embodiments of the present invention has the effect of preventing the occurrence of expulsion, it is more effective to apply certain embodiments of the present invention to welding of a sheet set including at least one sheet selected from those steel sheets.

Therefore, even when at least one of the steel sheets included in the sheet set to be welded is a high-strength steel sheet having a tensile strength of 980 MPa or more, the occurrence of expulsion is prevented, and a nugget with a large diameter can be formed.

Even when at least one of the steel sheets included in the sheet set to be welded is a high-strength steel sheet containing components including 0.15≤C≤0.30 (% by mass), 1.9≤Mn≤5.0 (% by mass), and 0.2≤Si≤2.0 (% by mass), the occurrence of expulsion is prevented, and a nugget with a large diameter can be formed.

Moreover, even when at least one of the steel sheets included in the sheet set to be welded is a galvanized steel sheet, the occurrence of expulsion is prevented, and a nugget with a large diameter can be formed. The galvanized steel sheet is a steel sheet including a coating layer containing Zn as a main component and is intended to encompass any conventionally known galvanized layer. Specific examples of the coating layer containing Zn as a main component include a hot-dip galvanized layer, an electrogalvanized layer, an Al coating layer, a Zn—Al coating layer, and a Zn—Ni layer.

In the resistance spot welding method according to embodiments of the present invention, the electric current is supplied and suspended while the electrode force during the electric current supply is controlled appropriately as described above. In this manner, the occurrence of expulsion is prevented, and a nugget with a large diameter can be formed. Therefore, even when work disturbances such as a sheet gap are present, the diameter of the nugget can be ensured stably.

Example 1

In Examples of the present invention, a servo motor pressurizing-type resistance welding device attached to a C gun and including a DC power source was used to perform resistance spot welding on a sheet set 3 including two overlapping hot-dip galvannealed steel sheets (a lower steel sheet 1 and an upper steel sheet 2) as shown in FIG. 1 to thereby produce a resistance spot-welded joint.

In this case, the electric current was supplied under conditions shown in Table 1.

The electrodes 4 and 5 used were DR type electrodes made of alumina-dispersed copper and having a tip radius of curvature R of 40 mm and a tip diameter of 8 mm. The test pieces used were high-strength steel sheets having a 980 MPa-class tensile strength and sheet thicknesses of 1.2 mm and 2.0 mm and a high-strength steel sheet having a 1,470 MPa-class tensile strength and a sheet thickness of 2.0 mm. Two steel sheets of the same type and with the same thickness were stacked and welded.

The electrode force during the electric current supply was measured using a strain gauge attached to the C gun. The electrode force was changed such that the measured electrode force was adjusted to a prescribed value.

Table 1 shows the results of studies on the occurrence of expulsion during welding and the diameter of the nugget. The diameter of the nugget was evaluated based on the structure of an etched cross section as follows. Let the sheet thickness be t (mm). Then a "Good" rating was given when the diameter of the nugget was equal to or larger than $5.5\sqrt{t}$. A "Poor" rating was given when the diameter of the nugget was less than $5.5\sqrt{t}$. Specifically, a nugget diameter equal to or larger than $5.5\sqrt{t}$ was set to be an appropriate diameter.

TABLE 1

| | Test piece | | Set electrode | First current supply | | | First suspension | | | Second current supply | | | Evaluation | |
|---|---|---|---|---|---|---|---|---|---|---|---|---|---|---|
| No. | Tensile strength (MPa) | Sheet thickness (mm) | force $F_i$ (kN) | $I_1$ (kA) | $T_1$ (ms) | $F_h(1)/F_i$ | $T_{c1}$ (ms) | $F_c(1)/F_i$ | $F_c(1)/F_h(1)$ | $I_2$ (kA) | $T_2$ (ms) | Occurrence of expulsion | of nugget diameter | Remarks |
| 1 | 980 | 1.2 | 5.0 | 10 | 60 | 1.05 | 20 | 1.03 | 0.98 | 8.5 | 280 | No | Good | Inventive Example |
| 2 | 980 | 1.2 | 5.0 | 10 | 60 | 1.05 | 40 | 1.00 | 0.95 | 8.5 | 280 | Yes | Poor | Comparative Example |
| 3 | 980 | 1.2 | 5.0 | 10 | 60 | 1.01 | 20 | 1.00 | 0.99 | 8.5 | 280 | No | Poor | Comparative Example |
| 4 | 980 | 1.2 | 5.0 | 8.5 | 60 | 1.03 | 0 | — | — | 8.5 | 220 | Yes | Poor | Comparative Example |
| 5 | 1470 | 2.0 | 6.0 | 9 | 60 | 1.07 | 20 | 1.04 | 0.98 | 7.8 | 300 | No | Good | Inventive Example |
| 6 | 1470 | 2.0 | 6.0 | 9 | 60 | 1.08 | 60 | 1.00 | 0.92 | 7.8 | 320 | Yes | Poor | Comparative Example |
| 7 | 1470 | 2.0 | 6.0 | 9 | 60 | 1.03 | 20 | 1.00 | 0.97 | 7.8 | 320 | No | Poor | Comparative Example |
| 8 | 1470 | 2.0 | 6.0 | 8 | 60 | 1.05 | 0 | — | — | 7.8 | 260 | Yes | Poor | Comparative Example |
| 9 | 980 | 1.2 | 5.0 | 12 | 20 | 1.03 | 20 | 1.02 | 0.99 | 8.5 | 280 | No | Good | Inventive Example |
| 10 | 980 | 1.2 | 5.0 | 9 | 80 | 1.08 | 60 | 1.05 | 0.97 | 8.5 | 280 | No | Good | Inventive Example |
| 11 | 980 | 1.2 | 5.0 | 9 | 80 | 1.10 | 200 | 1.00 | 0.91 | 8.5 | 280 | Yes | Poor | Comparative Example |

TABLE 1-continued

| | Test piece | | Set | First current | | | First suspension | | | Second current | | Evaluation | | |
|---|---|---|---|---|---|---|---|---|---|---|---|---|---|---|
| | Tensile | Sheet | electrode | supply | | | | | | supply | | | | |
| No. | strength (MPa) | thickness (mm) | force Fi (kN) | $I_1$ (kA) | $T_1$ (ms) | $F_h(1)/F_i$ | $T_{c1}$ (ms) | $F_c(1)/F_i$ | $F_c(1)/F_h(1)$ | $I_2$ (kA) | $T_2$ (ms) | Occurrence of expulsion | of nugget diameter | Remarks |
| 12 | 980 | 2.0 | 5.5 | 9.5 | 60 | 1.05 | 20 | 1.04 | 0.98 | 8 | 280 | No | Good | Inventive Example |
| 13 | 980 | 2.0 | 5.5 | 9 | 60 | 1.05 | 200 | 1.00 | 0.95 | 8 | 280 | Yes | Poor | Comparative Example |
| 14 | 980 | 2.0 | 5.5 | 11 | 60 | 1.18 | 20 | 1.07 | 0.91 | 8 | 280 | Yes | Poor | Comparative Example |
| 15 | 980 | 2.0 | 5.5 | 8 | 60 | 1.02 | 0 | — | — | 8 | 220 | Yes | Poor | Comparative Example |

In Table 1, $I_1$ (kA) is the current value in the first electric current supply, $T_1$ (ms) is the current supply time in the first electric current supply, and $F_h^{(1)}/F_i$ is the ratio of the electrode force $F_h^{(1)}$ to the initial electrode force Fi. $Tc_1$ (ms) is the first suspension time, and $F_c^{(1)}/F_i$ is the ratio of the electrode force $F_c^{(1)}$ to the initial electrode force Fi. $F_c^{(1)}/F_h^{(1)}$ is the ratio of the electrode force $F_c^{(N)}$ at which the electric current supply is resumed to the electrode force $F_h^{(N)}$ at which the suspension of the electric current supply is started. $I_2$ (kA) is the current value in the second electric current supply, and $T_2$ (ms) is the current supply time in the second electric current supply.

As can be seen from Table 1, when the resistance spot welding was performed according to embodiments of the present invention, no expulsion occurred, and each nugget formed had an appropriate diameter, in contrast to Comparative Examples.

Example 2

In Examples of the present invention, a servo motor pressurizing-type resistance welding device attached to a C gun and including a DC power source was used to perform resistance spot welding on a sheet set including three overlapping hot-dip galvannealed steel sheets to thereby produce a resistance spot-welded joint.

In this case, the electric current was supplied under conditions shown in Table 2.

The electrodes 4 and 5 used were DR type electrodes made of alumina-dispersed copper and having a tip radius of curvature R of 40 mm and a tip diameter of 8 mm. The test pieces used were a 980 MPa class high-strength steel sheet having a sheet thickness of 1.2 mm and a 1,470 MPa class high-strength steel sheet having a sheet thickness of 1.2 mm. Three steel sheets of the same type and with the same thickness were stacked and welded.

The electrode force during the electric current supply was measured using a strain gauge attached to the C gun. The electrode force was changed such that the measured electrode force was adjusted to a prescribed value.

Table 2 shows the results of studies on the occurrence of expulsion during welding and the diameter of the nugget. The diameter of the nugget was evaluated based on the structure of an etched cross section as follows. Let the sheet thickness be t (mm). Then a "Good" rating was given when the diameter of the nugget was equal to or larger than 5.5 √t. A "Poor" rating was given when the diameter of the nugget was less than 5.5 √t. Specifically, a nugget diameter equal to or larger than 5.5 √t was set to be an appropriate diameter.

The same test was repeated 10 times, and the variations in nugget diameter were evaluated. When the diameters obtained were appropriate and the range of variations in nugget diameter was equal to or less than 0.1 √t, an "Excellent" rating was given.

TABLE 2

| | Test piece | | Set | First current | | | First suspension | | | Second current | | |
|---|---|---|---|---|---|---|---|---|---|---|---|---|
| | Tensile | Sheet | electrode | supply | | | | | | supply | | |
| No. | strength (MPa) | thickness (mm) | force Fi (kN) | $I_1$ (kA) | $T_1$ (ms) | $F_h(1)/F_i$ | $T_{c1}$ (ms) | $F_c(1)/F_i$ | $F_c(1)/F_h(1)$ | $I_2$ (kA) | $T_2$ (ms) | $F_h(2)/F_c(1)$ |
| 1 | 980 | 1.0 | 4.5 | 9.5 | 60 | 1.07 | 20 | 1.04 | 0.98 | 9 | 60 | 1.06 |
| 2 | 980 | 1.0 | 4.5 | 9.5 | 60 | 1.07 | 20 | 1.04 | 0.98 | 5 | 60 | 1.02 |
| 3 | 980 | 1.0 | 4.5 | 9.5 | 60 | 1.07 | 20 | 1.04 | 0.98 | — | — | — |
| 4 | 980 | 1.0 | 4.5 | 6 | 100 | 1.01 | 60 | 1.00 | 0.99 | — | — | — |
| 5 | 980 | 1.0 | 4.5 | 8 | 60 | 1.02 | — | — | — | — | — | — |
| 6 | 1470 | 1.2 | 5.0 | 9.5 | 60 | 1.15 | 20 | 1.12 | 0.97 | 9 | 60 | 1.05 |
| 7 | 1470 | 1.2 | 5.0 | 9.5 | 60 | 1.15 | 20 | 1.12 | 0.97 | 6 | 60 | 1.02 |
| 8 | 1470 | 1.2 | 5.0 | 9.5 | 60 | 1.15 | 20 | 1.12 | 0.97 | — | — | — |
| 9 | 1470 | 1.2 | 5.0 | 6 | 100 | 1.01 | 20 | 1.00 | 0.99 | — | — | — |
| 10 | 1470 | 1.2 | 5.0 | 7 | 60 | 1.02 | — | — | — | — | — | — |

TABLE 2-continued

| | Second suspension | | | Third current supply | | | Evaluation | |
|---|---|---|---|---|---|---|---|---|
| No. | $T_{c2}$ (ms) | $F_c(2)/F_c(1)$ | $F_c(2)/F_h(2)$ | $I_3$ (kA) | $T_3$ (ms) | Occurrence of expulsion | of nugget diameter | Remarks |
| 1 | 20 | 1.02 | 0.96 | 8 | 300 | No | Excellent | Inventive Example |
| 2 | 20 | 1.00 | 0.98 | 8 | 300 | No | Good | Inventive Example |
| 3 | — | — | — | 8 | 300 | No | Good | Inventive Example |
| 4 | — | — | — | 8 | 300 | Yes | Poor | Comparative Example |
| 5 | — | — | — | 8 | 300 | Yes | Poor | Comparative Example |
| 6 | 20 | 1.02 | 0.97 | 7 | 300 | No | Excellent | Inventive Example |
| 7 | 20 | 1.00 | 0.98 | 7 | 300 | No | Good | Inventive Example |
| 8 | — | — | — | 7 | 300 | No | Good | Inventive Example |
| 9 | — | — | — | 7 | 300 | Yes | Poor | Comparative Example |
| 10 | — | — | — | 7 | 300 | Yes | Poor | Comparative Example |

In Table 2, $I_1$ (kA) is the current value in the first electric current supply, $T_1$ (ms) is the current supply time in the first electric current supply, and $F_h^{(1)}/F_i$ is the ratio of the electrode force $F_h^{(1)}$ to the initial electrode force Fi. $Tc_1$ (ms) is the first suspension time, and $F_c^{(1)}/F_i$ is the ratio of the electrode force $F_c^{(N)}$ to the initial electrode force Fi. $F_c^{(1)}/F_h^{(1)}$ is the ratio of the electrode force at which the electric current supply is resumed to the electrode force at which the suspension of the electric current supply is started. Similarly, $F_h^{(2)}/F_c^{(1)}$ is the ratio of the electrode force at which, after the second electric current supply, the suspension of the electric current supply is started to the electrode force immediately after the first suspension. $F_c^{(2)}/F_c^{(1)}$ is the ratio of the electrode force immediately after the second suspension to the electrode force immediately after the first suspension, and $F_c^{(2)}/F_h^{(2)}$ is the ratio of the electrode force immediately after the second suspension to the electrode force at which, after the second electric current supply, the suspension of the electric current supply is started. $I_2$ (kA) and $I_3$ (kA) are the current values in the second and third electric current supplies, respectively, $T_2$ (ms) and $T_3$ (ms) are the current supply times in the second and third electric current supplies, respectively, and $Tc_2$ (ms) is the second suspension time.

As can be seen from Table 2, when the resistance spot welding was performed according to embodiments of the present invention, no expulsion occurred, and each nugget formed had an appropriate diameter, in contrast to Comparative Examples. As can also be seen, when the second electric current supply was performed under the conditions of embodiments of the present invention, the effect of stabilizing the nugget diameter was obtained, in contrast to other cases.

REFERENCE SIGNS LIST 1 lower steel sheet
2 upper steel sheet
3 sheet set
4 lower electrode
5 upper electrode
6 nugget

The invention claimed is:

1. A resistance spot welding method for resistance spot-welding at least two steel sheets overlapping each other, the method comprising:
    starting a suspension of an electric current supply of from 20 ms to 60 ms inclusive when an electrode force F after the electric current supply is started changes from an initial electrode force Fi to an electrode force $F_h^{(1)}$ represented by formula (1)

$$1.03 \times Fi \leq F_h^{(1)} \leq 1.15 \times Fi, \quad (1)$$

while a lapse from the start of the electric current supply is between 20 ms and 80 ms inclusive; and
    resuming the electric current supply when the electrode force F reaches an electrode force $F_c^{(1)}$ represented by formula (2):

$$1.01 \times Fi \leq F_c^{(1)} \leq 0.99 \times F_h^{(1)} \quad (2).$$

2. The resistance spot welding method according to claim 1, further comprising,
    after the suspension of the electric current supply, repeating at least once the electric current supply of from 20 ms to 80 ms inclusive and the suspension of the electric current supply of from 20 ms to 60 ms inclusive such that,
    when the electrode force F during an Nth electric current supply changes from an electrode force $F_c^{(N-1)}$ immediately after an (N−1)th suspension of the electric current supply to an electrode force $F_h^{(N)}$ represented by formula (3), $$1.04 \times F_c^{(N-1)} \leq F_h^{(N)} \leq 1.15 \times F_c^{(N-1)}, \quad (3)$$

the suspension of the electric current supply is started, and then,
    the electric current supply is resumed when the electrode force F reaches an electrode force $F_c^{(N)}$ represented by formula (4):

$$F_c^{(N-1)} \leq F_c^{(N)} \leq 0.99 \times F_h^{(N)}, \quad (4)$$

wherein N is a natural number of 2 or more.

3. The resistance spot welding method according to claim 2, wherein the period of a last repetition of the electric current supply is from 100 ms to 300 ms inclusive.

4. The resistance spot welding method according to claim 2, wherein at least one of the at least two steel sheets comprises 0.15≤C≤0.30 (% by mass), 1.9≤Mn≤5.0 (% by mass), and 0.2≤Si≤2.0 (% by mass).

5. The resistance spot welding method according to claim 2, wherein at least one of the at least two steel sheets has a tensile strength of 980 MPa or more.

6. The resistance spot welding method according to claim 2, wherein at least one of the at least two steel sheets has, on a surface thereof, a coating layer containing zinc as a main component.

7. The resistance spot welding method according to claim 1, wherein the period of a last repetition of the electric current supply is from 100 ms to 300 ms inclusive.

8. The resistance spot welding method according to claim 7, wherein at least one of the at least two steel sheets comprises 0.15≤C≤0.30 (% by mass), 1.9≤Mn≤5.0 (% by mass), and 0.2≤Si≤2.0 (% by mass).

9. The resistance spot welding method according to claim 7, wherein at least one of the at least two steel sheets has a tensile strength of 980 MPa or more.

10. The resistance spot welding method according to claim 7, wherein at least one of the at least two steel sheets has, on a surface thereof, a coating layer containing zinc as a main component.

11. The resistance spot welding method according to claim 1, wherein at least one of the at least two steel sheets comprises 0.15≤C≤0.30 (% by mass), 1.9≤Mn≤5.0 (% by mass), and 0.2≤Si≤2.0 (% by mass).

12. The resistance spot welding method according to claim 11, wherein at least one of the at least two steel sheets has a tensile strength of 980 MPa or more.

13. The resistance spot welding method according to claim 11, wherein at least one of the at least two steel sheets has, on a surface thereof, a coating layer containing zinc as a main component.

14. The resistance spot welding method according to claim 1, wherein at least one of the at least two steel sheets has a tensile strength of 980 MPa or more.

15. The resistance spot welding method according to claim 14, wherein at least one of the at least two steel sheets has, on a surface thereof, a coating layer containing zinc as a main component.

16. The resistance spot welding method according to claim 1, wherein at least one of the at least two steel sheets has, on a surface thereof, a coating layer containing zinc as a main component.

* * * * *